(12) United States Patent
Chuang et al.

(10) Patent No.: US 7,688,082 B2
(45) Date of Patent: *Mar. 30, 2010

(54) CAPACITIVE FINGERPRINT SENSOR AND THE PANEL THEREOF

(75) Inventors: Kai Lan Chuang, Tainan County (TW); Ying Lieh Chen, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 143 days.

This patent is subject to a terminal disclaimer.

(21) Appl. No.: 12/034,328

(22) Filed: Feb. 20, 2008

(65) Prior Publication Data

US 2009/0206849 A1    Aug. 20, 2009

(51) Int. Cl.
*G01R 27/26* (2006.01)
*G06F 3/041* (2006.01)

(52) U.S. Cl. .................. 324/686; 324/662; 345/173

(58) Field of Classification Search ............... 324/662, 324/686; 345/173, 174
See application file for complete search history.

(56) References Cited

U.S. PATENT DOCUMENTS 6,049,620 A *  4/2000  Dickinson et al. ........... 382/124
6,906,529 B2 *  6/2005  Blanchard ................... 324/662
7,075,316 B2 *  7/2006  Umeda et al. ............... 324/658
7,099,497 B2 *  8/2006  Chou et al. .................. 382/124

OTHER PUBLICATIONS

Hiroyuki Hara, Mikio Sakurai, Mitsutoshi Miyasaka, Simon W.B. Tam, Satoshi Inoue and Tatsuya Shimoda, Low Temperature Polycrystalline Silicone TFT Fingerprint Sensor with Integrated Comparator Circuit, Journal 2004, pp. 403-406, IEEE.*
Hiroyuki Hara, Mikio Sakurai, Mitsutoshi Miyasaka, Simon W.B. Tam, Satoshi Inoue, and Tatsuya Shimoda; Low Temparature Polycrystalline Silicon TFT Fingerprint Sensor with Integrated Comparator Circuit; Journal; 2004; pp. 403-406; IEEE.
H.Hara, M.Miyasaka, C.Iriguchi, S.W.B.Tam, S.Inoue and T. Shimoda; A Capacitive Fingerprint Sensor with Integrated Comparator Based on LTPS TFTs; Journal; 2006; pp. 257-260; IDW.

* cited by examiner

*Primary Examiner*—Timothy J Dole
*Assistant Examiner*—Farhana Hoque
(74) *Attorney, Agent, or Firm*—WPAT, P.C.; Anthony King; Kay Yang

(57) ABSTRACT

A capacitive fingerprint sensor comprises a first transistor, a second transistor, a fingerprint capacitor and a third transistor. The fingerprint capacitor has a capacitance that is either a valley capacitance $C_{FV}$ or a ridge capacitance $C_{FR}$, wherein $C_{FV}$ is smaller than $C_{FR}$. The first transistor is configured to precharge the fingerprint capacitor. The second transistor is configured to discharge the fingerprint capacitor toward a bias voltage VB. The third transistor is configured to output the voltage of the fingerprint capacitor after discharge.

19 Claims, 6 Drawing Sheets

CAPACITIVE FINGERPRINT SENSOR AND THE PANEL THEREOF

BACKGROUND OF THE INVENTION

1. Field of the Invention

The present invention relates to a capacitive fingerprint sensor and the panel thereof, and more particularly to a capacitive fingerprint sensor using a plurality of transistors and the panel thereof.

2. Description of the Related Art

A fingerprint sensor is a sensor for recognizing a pattern of a human fingerprint and providing reliable personal identification. The fingerprint sensor is also widely used in portable products such as mobile phones or notebooks in order to achieve security of personal confidential information.

FIGS. 1A and 1B show a hint diagram about the relationship between the human finger and a substrate panel and the corresponding equivalent diagram. Generally, the fingerprint sensor could be implemented in a chip or embedded in an image panel. If the fingerprint sensor is implemented in a chip, the number 13 in FIG. 1A represents a passivation layer, which acts as the dielectric layer of the capacitor $C_d$. If the fingerprint sensor is embedded in an image panel, the number 11 in FIG. 1A represents ITO layer, and number 13 represents glass and thin films, such as color filter, polarizer and etc. The following description takes the fingerprint sensor embedded in the image panel as an example. In FIG. 1A, a glass 13, a top metal plate 11 and a substrate 12 are combined in series, and the glass 13 is the place where the human finger will touch. Normally, a capacitor $C_d$ exists in the glass 13, and a capacitor $C_p$ exists between the top metal plate 11 and the substrate 12. In FIG. 1B, the surface of the human finger has ridges and valleys, such as the ridge 14 and the valley 15. The valley 15 has a distance $d_2$ away from the glass 13 with a thickness $d_1$. Based on the structure, an additional capacitor C2 exists between the valley of the human finger and the surface of the glass 13. The equivalent capacitance of the ridge capacitor $C_{FR}$ is related to C1, and the equivalence capacitance of the valley capacitors $C_{FV}$ is related to C1//C2. The capacitances of C1 and C1//C2 are listed as follows:

$$C_1 = \frac{\varepsilon_1 A}{d_1}, \text{ and } C_1 // C_2 = \frac{1}{\frac{d_1}{\varepsilon_1 A} + \frac{d_2}{\varepsilon_2 A}}$$

Normally, the ridge capacitor $C_{FR}$ is far greater than the valley capacitors $C_{FV}$.

For sensing the human fingerprint, a readout circuit should be able to discern the difference between the ridge capacitor and the valley capacitor. However, it is not easy to achieve the required accuracy in difference. Some environmental conditions such as noise and cross talk will deteriorate the result.

SUMMARY OF THE INVENTION

The capacitive fingerprint sensor in accordance with one embodiment of the present invention comprises a first transistor, a second transistor, a fingerprint capacitor and a third transistor. The first transistor has a gate terminal, an input terminal and an output terminal, wherein the gate terminal is controlled by a first readout select line, and the input terminal is connected to a first bias voltage VA. The fingerprint capacitor is connected to the output terminal of the first transistor, wherein the fingerprint capacitor has a capacitance that is either a valley capacitance $C_{FV}$ or a ridge capacitance $C_{FR}$, and $C_{FV}$ is smaller than $C_{FR}$. The second transistor has a gate terminal, an input terminal and an output terminal, wherein the gate terminal is controlled by a second readout select line, the input terminal is connected to second bias voltage VB, the output terminal is connected to the fingerprint capacitor, and the second readout select line is immediately next to the first readout select line. The third transistor has a gate terminal, an input terminal and an output terminal, wherein the gate terminal is controlled by a scan line, the input terminal is connected to the fingerprint capacitor, and the output terminal is connected to a data line.

The capacitive fingerprint sensor in accordance with one embodiment of the present invention comprises a first transistor, a second transistor, a fingerprint capacitor and a third transistor. The fingerprint capacitor has a capacitance that is either a valley capacitance $C_{FV}$ or a ridge capacitance $C_{FR}$, wherein $C_{FV}$ is smaller than $C_{FR}$. The first transistor is configured to precharge the fingerprint capacitor. The second transistor is configured to discharge the fingerprint capacitor toward a bias voltage VB. The third transistor is configured to output the voltage of the fingerprint capacitor after discharge.

The panel system in accordance with one embodiment of the present invention comprises an active matrix area, a data driver, a scan driver, a readout circuit and an image processing circuit. The active matrix area has the above-mentioned capacitive fingerprint sensors. The data driver is configured to drive data lines to the capacitive fingerprint sensors. The scan driver is configured to control scan lines to the capacitive fingerprint sensors. The readout circuit is configured to receive readout lines of the capacitive fingerprint sensors and to identify the type of the fingerprint capacitor. The image processing circuit is connected to the readout circuit.

BRIEF DESCRIPTION OF THE DRAWINGS

The invention will be described according to the appended drawings in which.

PREFERRED EMBODIMENT OF THE PRESENT INVENTION

Figure 1B:
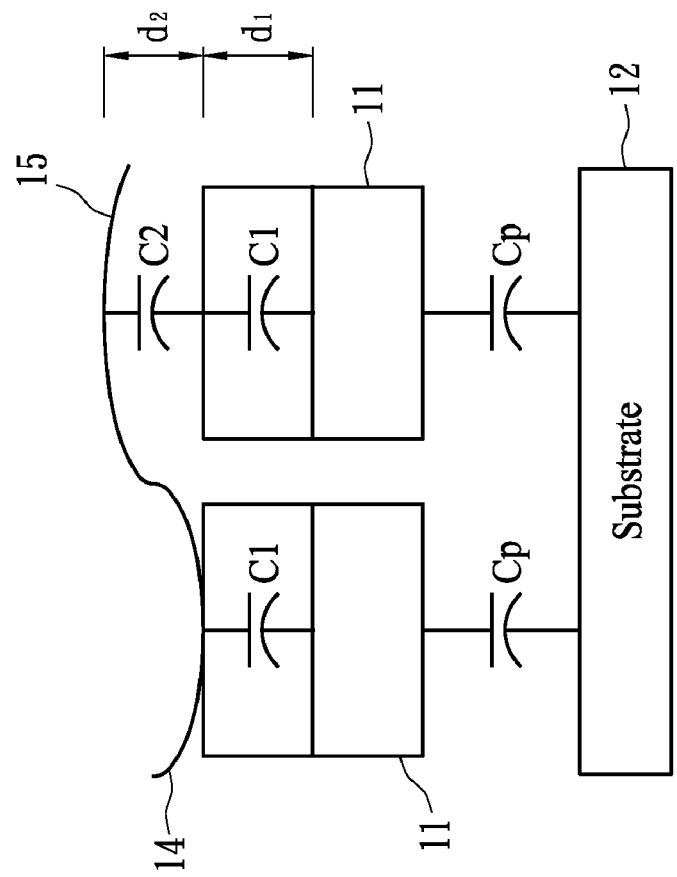
FIGS. 1A and 1B show an equivalent circuit of a fingerprint sensor.
Figure 1A:
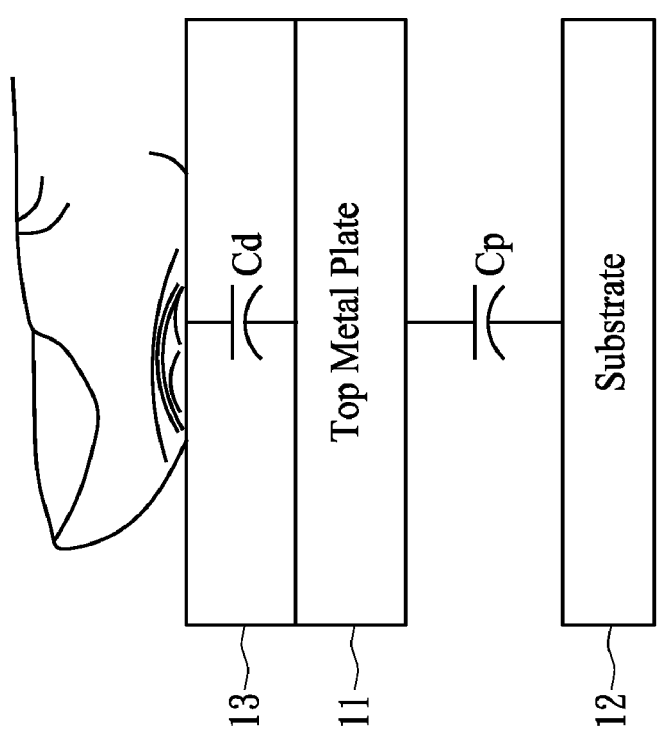
Figure 2:
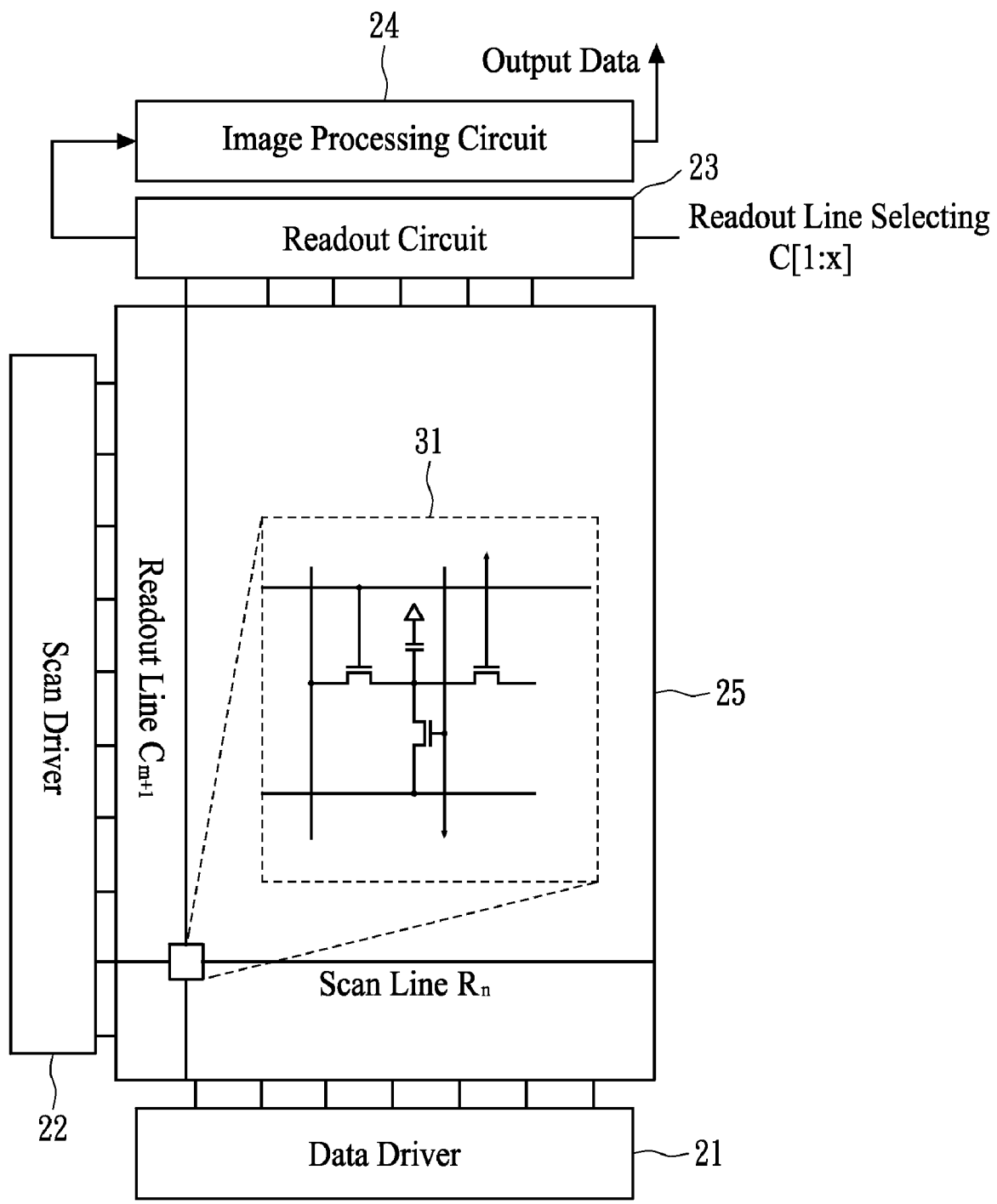
FIG. 2 shows the panel in accordance with an embodiment of the present invention.

FIG. 2 shows a panel in accordance with an embodiment of the present invention. The panel system comprises an active matrix area 25, a data driver 21, a scan driver 22, a readout circuit 23 and an image processing circuit 24. The active matrix area 25 has a plurality of capacitive fingerprint sensors 31, each of which can selectively coexist with an image pixel in a pixel unit. The data driver 21 is configured to drive data lines. The scan driver 22 is configured to control scan lines to the capacitive fingerprint sensors 31. Normally, the scan line is asserted during the operation period of the capacitive fingerprint sensors connected to the scan line. The readout circuit 23 is configured to receive analog signals of readout lines of the capacitive fingerprint sensors 31 and to identify the type of the fingerprint capacitor, which exhibits the features of the ridge capacitor or valley capacitor. The image processing circuit 24 is connected to the readout circuit 23. The structure in FIG. 2 takes an embedded structure in an image panel as an example. But as known by persons skilled in this art, the structure in FIG. 2 can be easily transformed and applied to be implemented in a chip.

Figure 3:
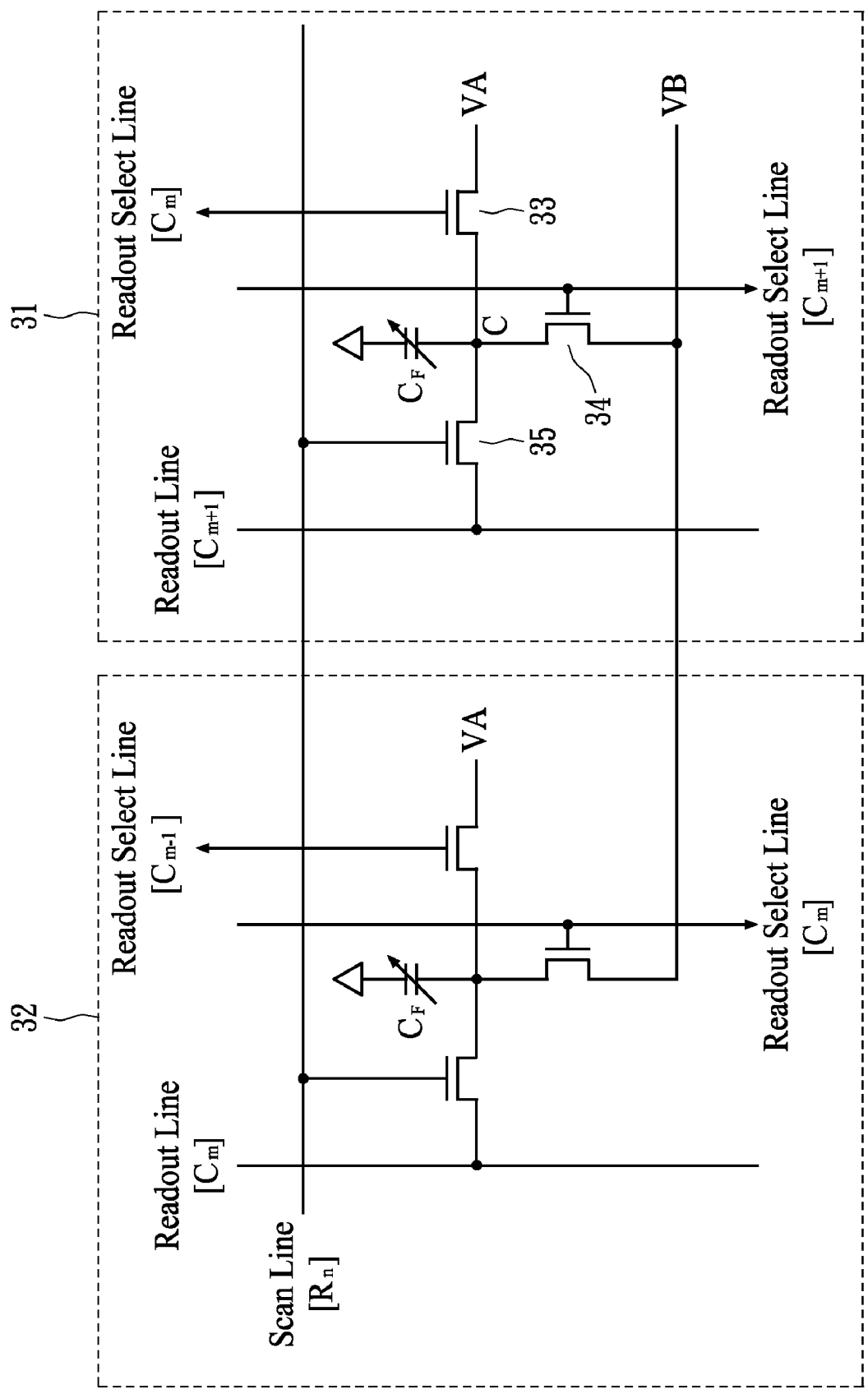
FIG. 3 shows the fingerprint sensor in accordance with an embodiment of the present invention.

FIG. 3 shows the fingerprint sensor in accordance with an embodiment of the present invention. The capacitive fingerprint sensor 31 comprises a first transistor 33, a second transistor 34, a fingerprint capacitor $C_F$ and a third transistor 35. FIG. 3 in fact shows two adjacent sets of fingerprint sensors in the same row with the same scan line. Normally, when the preceding fingerprint sensor 32 is in an evaluation phase, the fingerprint sensor 31 is in a precharge phase. Similarly, when the fingerprint sensor 31 is in an evaluation phase, the succeeding fingerprint sensor is in a precharge phase. The first transistor 33 has a gate terminal, an input terminal and an output terminal, wherein the gate terminal is controlled by a first readout select line $C_m$, and the input terminal is connected to a first bias voltage VA. The second transistor 34 has a gate terminal, an input terminal and an output terminal, wherein the gate terminal is controlled by the second readout select line $C_{m+1}$, and the input terminal is connected to a second bias voltage VB. Normally, the voltage VA is greater than the voltage VB. The fingerprint capacitor $C_F$ is connected to the output terminal of the second transistor 34, wherein the fingerprint capacitor $C_F$ has a capacitance that is either a valley capacitance $C_{FV}$ or a ridge capacitance $C_{FR}$. The third transistor 35 has a gate terminal, an input terminal and an output terminal, wherein the gate terminal is controlled by a scan line $R_n$, the input terminal is connected to the fingerprint capacitor, and the output terminal is connected to a readout line. The second readout select line $C_{m+1}$ is immediately next to the first readout select line $C_m$.

Figure 4:
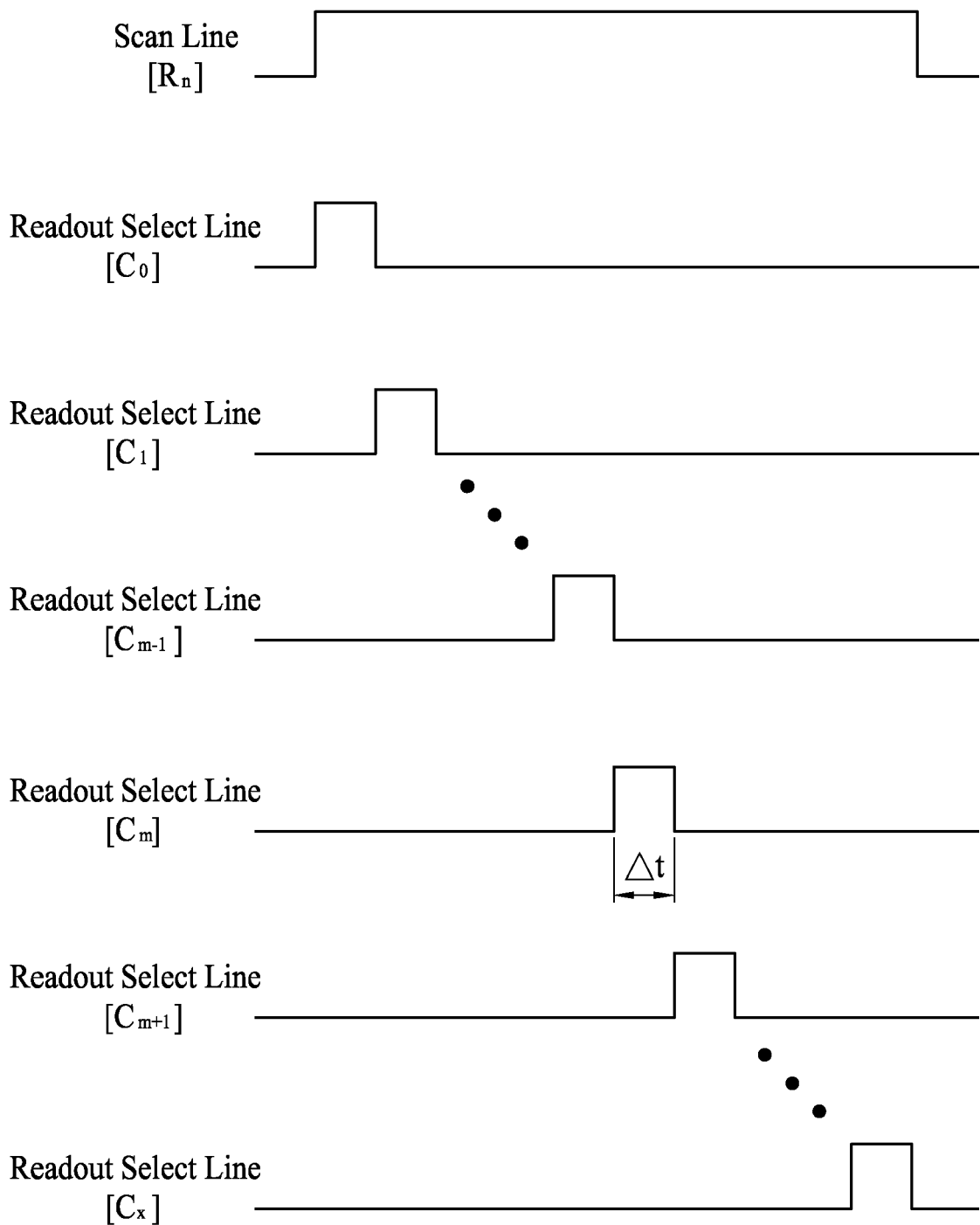
FIG. 4 shows the timing diagram of the circuit in FIG. 3.

FIG. 4 shows the timing diagram of the circuit in FIG. 3. Normally, the fingerprint sensors in the same row share the same scan line $R_n$, which is asserted over the entire duration of operation of the fingerprint sensors in the same row. The readout select lines $C_0$ to $C_x$ connecting to each fingerprint sensor are asserted in sequence and do not overlap each other. The readout select lines $C_0$ to $C_x$ are used to initiate the evaluation phase and precharge phase of each fingerprint sensor, so as to sequentially read out data from the fingerprint sensors of one row corresponding to the asserted scan line. The pulse width of each readout select line is denoted as $\Delta t$.

Figure 5A:
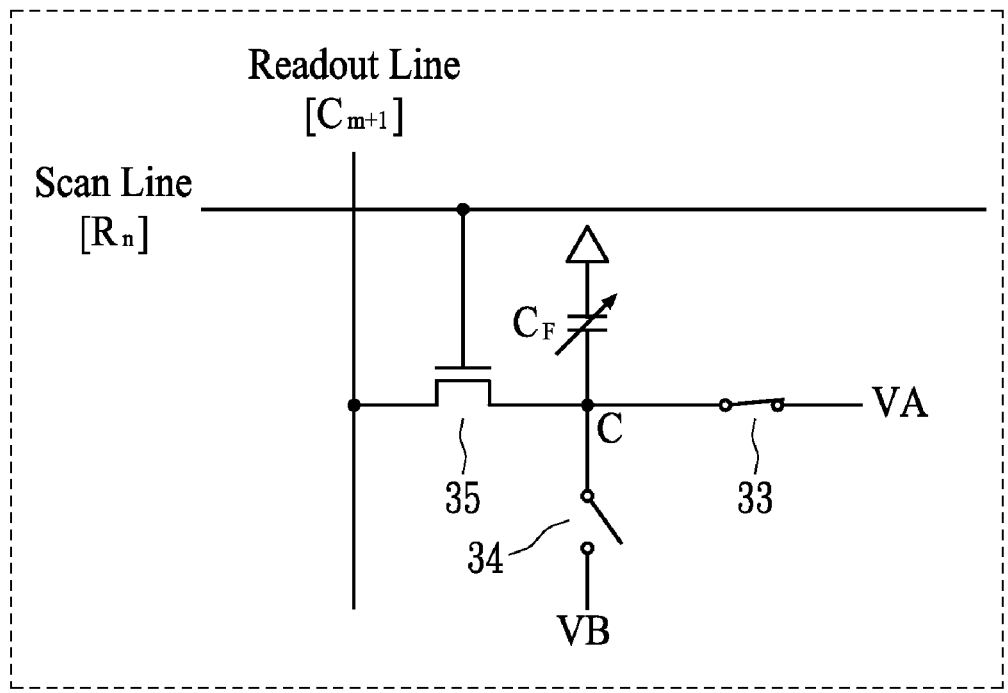
FIGS. 5A and 5B show the precharge and evaluation phases of the circuit in FIG. 3.

FIG. 5A shows the equivalent circuit of the fingerprint sensor 31 in the precharge phase. In the precharge phase for the fingerprint sensor 31, the readout select line $C_m$ is asserted, the first transistor 33 is enabled, and the first bias voltage VA precharges the fingerprint capacitor $C_F$.

Figure 5B:
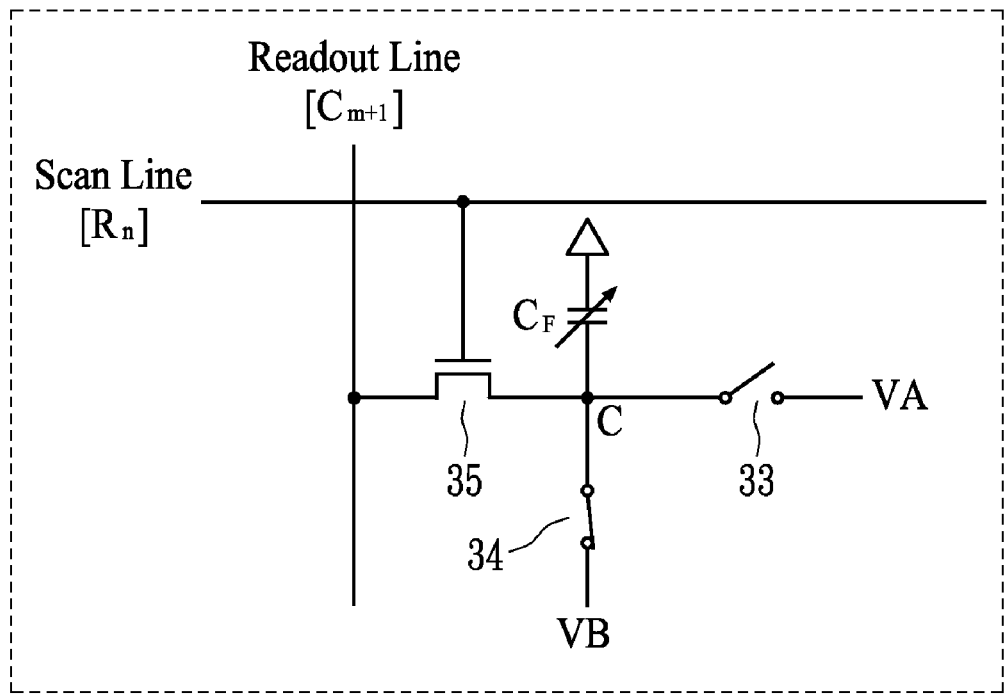

FIG. 5B shows the equivalent circuit of the fingerprint sensor 31 in the evaluation phase. In the evaluation for the fingerprint sensor 31, the readout select line $C_{m+1}$ is asserted, the second transistor 34 is enabled, and the electrical charges stored in the fingerprint capacitor $C_F$ are redistributed. At this moment, the scan line is still asserted, the third transistor 35 is enabled, and the readout line outputs voltage $$VB + (VA - VB) \times e^{\frac{\Delta t}{RC_{FR}}} \text{ or } VB + (VA - VB) \times e^{\frac{\Delta t}{RC_{FV}}},$$

depending on which portion of the human fingerprint, i.e., ridge or valley is detected, where R represents a turn-on resistance of the second transistor 34. The outputted voltage of the readout line is larger if the ridge is detected than if the valley is detected. More particularly, the voltage of the fingerprint capacitor after discharge is inversely proportional to the period of the evaluation phase.

Figure 6:
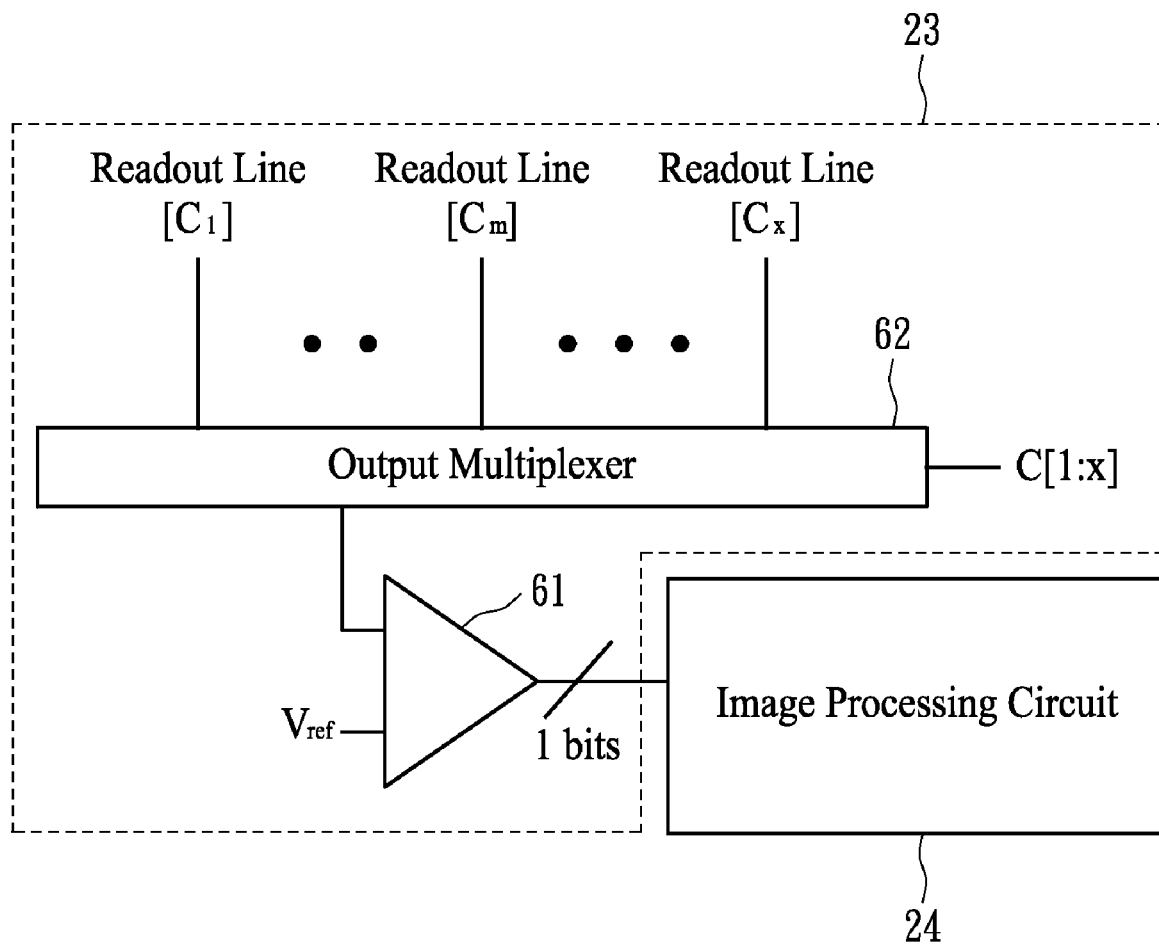
FIG. 6 shows the readout circuit in accordance with an embodiment of the present invention.

FIG. 6 shows the readout circuit in accordance with an embodiment of the present invention. The readout circuit 23 comprises a multiplexer 62 and a comparator 61. The input end of the multiplexer 62 is connected to the readout lines, and the output end of the multiplexer 62 is connected to the comparator 61, which outputs one bit to the image processing circuit 24. For distinguishing the ridge and valley capacitors, the comparator 61 utilizes a threshold voltage $V_{REF}$, and $$VB + (VA - VB) \times e^{\frac{\Delta t}{RC_{FR}}} > V_{REF} > VB + (VA - VB) \times e^{\frac{\Delta t}{RC_{FV}}}.$$

Therefore, if the comparator 61 outputs logic high, it means that the data received from the fingerprint sensor implies a ridge capacitor. Otherwise, the data implies a valley capacitor.

The above-described embodiments of the present invention are intended to be illustrative only. Numerous alternative embodiments may be devised by persons skilled in the art without departing from the scope of the following claims.

What is claimed is:

1. A capacitive fingerprint sensor, comprising:
   a first transistor having a gate terminal, an input terminal and an output terminal, wherein the gate terminal is controlled by a first readout select line, and the input terminal is connected to a first bias voltage VA;
   a fingerprint capacitor connected to the output terminal of the first transistor, wherein the fingerprint capacitor has a capacitance that is either a valley capacitance $C_{FV}$ or a ridge capacitance $C_{FR}$, and $C_{FV}$ is smaller than $C_{FR}$;
   a second transistor having a gate terminal, an input terminal and an output terminal, wherein the gate terminal is controlled by a second readout select line, the input terminal is connected to a second bias voltage VB, the output terminal is connected to the fingerprint capacitor, and the second readout select line is immediately next to the first readout select line; and
   a third transistor having a gate terminal, an input terminal and an output terminal, wherein the gate terminal is controlled by a scan line, the input terminal is connected to the fingerprint capacitor, and the output terminal is connected to a readout line.

2. The capacitive fingerprint sensor of claim 1, wherein in a precharge phase, the first readout select line is asserted.

3. The capacitive fingerprint sensor of claim 2, wherein in an evaluation phase, the scan line and the second readout select line are asserted such that a readout voltage at the output terminal of the third transistor is outputted to the readout line.

4. The capacitive fingerprint sensor of claim 3, wherein the readout voltage is larger if the fingerprint capacitor has the ridge capacitance $C_{FR}$ than if the fingerprint capacitor has the valley capacitance $C_{FV}$.

5. The capacitive fingerprint sensor of claim 4, wherein the readout line has a voltage of $$VB + (VA - VB) \times e^{\frac{\Delta t}{RC_{FR}}} \text{ or } VB + (VA - VB) \times e^{\frac{\Delta t}{RC_{FR}}}$$

during the evaluation phase, R represents a turn-on resistance of the second transistor, and Δt represents the pulse width of the first and second readout select lines.

6. The capacitive fingerprint sensor of claim 3, wherein the scan line is asserted during the precharge phase and evaluation phase.

7. A capacitive fingerprint sensor, comprising:
a fingerprint capacitor having a capacitance that is either a valley capacitance $C_{FV}$ or a ridge capacitance $C_{FR}$, wherein $C_{FV}$ is smaller than $C_{FR}$;
a first transistor precharging the fingerprint capacitor;
a second transistor discharging the fingerprint capacitor toward a bias voltage VB; and
a third transistor outputting the voltage of the fingerprint capacitor after discharge.

8. The capacitive fingerprint sensor of claim 7, wherein the voltage of the fingerprint capacitor after redistribution has a larger value for the ridge capacitance $C_{FR}$ than for the valley capacitance $C_{FV}$.

9. The capacitive fingerprint sensor of claim 8, wherein the first transistor is precharging the fingerprint capacitor to a voltage VA, and the voltage VA is greater than the voltage VB.

10. The capacitive fingerprint sensor of claim 9, wherein the first transistor is used in a precharge phase, the second transistor is used in an evaluation phase, and the precharge phase does not overlap the evaluation phase.

11. The capacitive fingerprint sensor of claim 10, wherein the voltage of the fingerprint capacitor after discharge is inversely proportional to the period of the evaluation phase.

12. The capacitive fingerprint sensor of claim 11, wherein the voltage of the fingerprint capacitor after redistribution has a voltage of $$VB + (VA - VB) \times e^{\frac{\Delta t}{RC_{FR}}} \text{ or } VB + (VA - VB) \times e^{\frac{\Delta t}{RC_{FV}}}$$

during the evaluation phase, R represents a turn-on resistance of the second transistor, and Δt represents the pulse width of readout select lines connected to the first and second transistors.

13. A panel system including capacitive fingerprint sensors, comprising:
an active matrix area having capacitive fingerprint sensors, the capacitive fingerprint sensor comprising:
a first transistor having a gate terminal, an input terminal and an output terminal, wherein the gate terminal is controlled by a first readout select line, and the input terminal is connected to a first bias voltage VA;
a fingerprint capacitor connected to the output terminal of the first transistor, wherein the fingerprint capacitor has a capacitance that is either a valley capacitance $C_{FV}$ or a ridge capacitance $C_{FR}$, and $C_{FV}$ is smaller than $C_{FR}$;
a second transistor having a gate terminal, an input terminal and an output terminal, wherein the gate terminal is controlled by a second readout select line, the input terminal is connected to a second bias voltage VB, the output terminal is connected to the fingerprint capacitor, and the second readout select line is immediately next to the first readout select line; and
a third transistor having a gate terminal, an input terminal and an output terminal, wherein the gate terminal is controlled by a scan line, the input terminal is connected to the fingerprint capacitor, and the output terminal is connected to a data line;
a data driver driving data lines;
a scan driver controlling scan lines to the capacitive fingerprint sensors;
a readout circuit receiving readout lines of the capacitive fingerprint sensors and to identify the type of the fingerprint capacitor; and
an image processing circuit connected to the readout circuit.

14. The panel system of claim 13, wherein the readout circuit comprises a multiplexer and a comparator, the input end of the multiplexer is connected to the readout lines, and the output end of the multiplexer is connected to the comparator.

15. The panel system of claim 14, wherein the comparator outputs to the image processing circuit.

16. The panel system of claim 14, wherein the comparator has a threshold voltage $$V_{REF}, VB + (VA - VB) \times e^{\frac{\Delta t}{RC_{FR}}} > V_{REF} > VB + (VA - VB) \times e^{\frac{\Delta t}{RC_{FV}}},$$

R represents a turn-on resistance of the second transistor, and Δt represents the pulse width of the first and second readout select lines.

17. The panel system of claim 13, wherein the active matrix area further includes image pixels connected to the data lines.

18. The panel system of claim 13, wherein one of the capacitive fingerprint sensors is in a precharge phase when its preceding adjacent one is in an evaluation phase.

19. The panel system of claim 13, wherein one scan line is asserted during the operations of the capacitive fingerprint sensors connected to the scan line.

* * * * *